(12) United States Patent
Ono et al.

(10) Patent No.: US 6,935,794 B2
(45) Date of Patent: Aug. 30, 2005

(54) IMAGE RECORDING APPARATUS

(75) Inventors: Takehisa Ono, Kanagawa (JP); Koichi Sato, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 872 days.

(21) Appl. No.: 09/983,270

(22) Filed: Oct. 23, 2001

(65) Prior Publication Data

US 2002/0085246 A1 Jul. 4, 2002

(30) Foreign Application Priority Data

Oct. 23, 2000 (JP) ........................................ 2000-322707

(51) Int. Cl.$^7$ ............................................... G03D 3/08
(52) U.S. Cl. .................... 396/612; 396/620; 355/27; 355/72; 355/75; 226/91; 226/154; 226/183; 242/324; 242/534
(58) Field of Search ................................. 396/612, 616, 396/617, 620; 355/27–29, 72, 75; 242/324, 534; 226/91, 92, 115, 154, 176, 183

(56) References Cited

U.S. PATENT DOCUMENTS 5,112,002 A * 5/1992 Shibata et al. ............... 242/534
5,713,504 A * 2/1998 Arai et al. ................... 226/183

* cited by examiner

*Primary Examiner*—D. Rutledge
(74) *Attorney, Agent, or Firm*—Sughrue Mion, PLLC

(57) ABSTRACT

An image recording apparatus in which a photosensitive material is rewound into a magazine while maintaining a predetermined disposition. Prior to rewinding of the photosensitive material, a distance between concave portions of guide members which constitute a guide portion is set to be substantially equal to the photosensitive material width and a nipping state between a pair of pulling-out rollers is cancelled. Because the nipping state is cancelled, the photosensitive material can be displaced in a width direction. Therefore, the photosensitive material can be rewound into the magazine while maintaining the predetermined disposition, and any skew is corrected by the concave portions of the guide members.

15 Claims, 10 Drawing Sheets

IMAGE RECORDING APPARATUS

BACKGROUND OF THE INVENTION

1. Field of the Invention

The present invention relates to an image recording apparatus in which an image is formed by exposing a photosensitive material.

2. Description of the Related Art

In recent years, there have been realized printing apparatuses that use digital exposure methods; e.g., a digital photo printer in which image data is formed by photoelectrically reading an image recorded on a film and converting the image into digital signals, which are in turn transformed into digital image data after undergoing various image processes, then scan-exposing a photosensitive material to have an image (latent image) recorded thereon by radiating a light beam modulated based on the digital image data, and finally outputting the image as a print (photograph) after development.

In a digital photo printer, a film is photoelectrically read, and gradation correction and so forth are carried out by image (signal) processing, whereby exposure conditions are determined. Therefore, it is possible to optionally carry out print image editing, such as image composing and image splitting, and image processing, such as color/density adjustment and edge enhancement, and output of prints processed properly according to purpose. Further, image data for print images can be imported into computers and stored in recording media such as floppy disks. Moreover, digital photo printers can output prints having higher picture-quality with respect to resolution and color/density reproducibility than conventional printers which use direct exposure.

Such a digital photo printer is structured of an input apparatus having a scanner (image reading apparatus) and an image processing apparatus, and an output apparatus having a printing apparatus (image recording apparatus) and a developing unit. In the scanner, a projected light from the film which has an image formed thereon is photoelectrically read by an image sensor such as a CCD sensor, and then transmitted to the image processing apparatus as image data (image data signals) for the film. The image processing apparatus carries out predetermined image processing on the image data, and then the processed data is transmitted to the printing apparatus as image data (exposure conditions) for the film. If the printing apparatus is an apparatus using scan-exposure by a light beam, a light beam modulated based on the image data transmitted is deflected in a main-scanning direction and photosensitive material is conveyed in a sub-scanning direction perpendicular to the main-scanning direction, whereby a latent image is formed on the photosensitive material and back-printing is carried out. In the developing unit, the exposed photosensitive material is processed by predetermined processing and then made to be a print or photograph which is visibly reproduced or transformed from the image recorded on the film.

In such a printing apparatus, the photosensitive material, which is accommodated in a magazine, is nipped and pulled out from the magazine by a pair of pulling-out rollers, which are provided in the apparatus body, and then conveyed to an exposure section. In this case, after a sequential exposure process is carried out, there is a possibility that an unexposed portion of the photosensitive material, which was nipped and pulled out by the pair of pulling-out rollers and which has not reached the exposure section, is rewound in a nipped state.

However, when the photosensitive material is rewound in this nipped state, the photosensitive material is easily skewed, whereby guide members, or magazine outlet portions and the like may scratch or damage the photosensitive material.

SUMMARY OF THE INVENTION

In view of the aforementioned facts, a main object of the present invention is to facilitate reliable rewinding of a photosensitive material without imparting damage to the same in an image recording apparatus.

In order to achieve the above object, according to an aspect of the present invention, there is provided an image recording apparatus in which an image is formed by exposing a photosensitive material, the apparatus comprising: a magazine for accommodating the photosensitive material in a light-shielded state; a pair of rollers which nip and pull out the photosensitive material from the magazine to inside the apparatus; a widthwise guide which is disposed in a vicinity of the pair of rollers and which restricts a rewinding direction of the photosensitive material by engaging edges of the photosensitive material at a time of rewinding of the photosensitive material; and a restriction canceling mechanism for canceling a width direction restriction of the photosensitive material due to the pair of rollers; wherein, when the photosensitive material is to be rewound into the magazine, the restriction of the photosensitive material due to the pair of rollers is cancelled by the restriction canceling mechanism, and a guide width defined by the widthwise guide is made narrower than when the photosensitive material is being pulled out.

In accordance with another aspect of the present invention, there is provided an image recording apparatus in which an image is formed by exposing a photosensitive material, the apparatus comprising: a magazine for accommodating the photosensitive material in a light-shielded state; a pair of rollers which nip and pull out the photosensitive material from the magazine to inside the apparatus body; a widthwise guide which is disposed in a vicinity of the pair of rollers and which restricts a rewinding direction of the photosensitive material by engaging edges of the photosensitive material at a time of rewinding of the photosensitive material; and a restriction canceling mechanism for canceling a width direction restriction of the photosensitive material due to the pair of rollers; wherein, when the photosensitive material is to be rewound into the magazine, the restriction of the photosensitive material due to the pair of rollers is cancelled by the restriction canceling mechanism, and a guide width defined by the widthwise guide is set such that skew of the photosensitive material can be corrected.

In accordance with yet another aspect of the present invention, there is provided a method for rewinding photosensitive material in an image recording apparatus that has a magazine for accommodating the photosensitive material in a light-shielded state, a pair of rollers which nip and pull out the photosensitive material from the magazine to inside the apparatus, a widthwise guide which is disposed in a vicinity of the pair of rollers and which controls a rewinding direction of the photosensitive material by engaging with edges of the photosensitive material during the rewinding of the photosensitive material, the method comprising the steps of: canceling a width direction restriction of the photosensitive material due to the pair of rollers; making a guide width defined by the widthwise guide narrower than when the photosensitive material is being pulled out; and rewinding the photosensitive material.

DESCRIPTION OF THE PREFERRED EMBODIMENT

Referring to the accompanying drawings, an embodiment of an image recording apparatus according to the present invention will be discussed below. Firstly, an outline of the apparatus, and secondly, a nip canceling mechanism and a guide-width adjusting mechanism will be explained.

Figure 1:
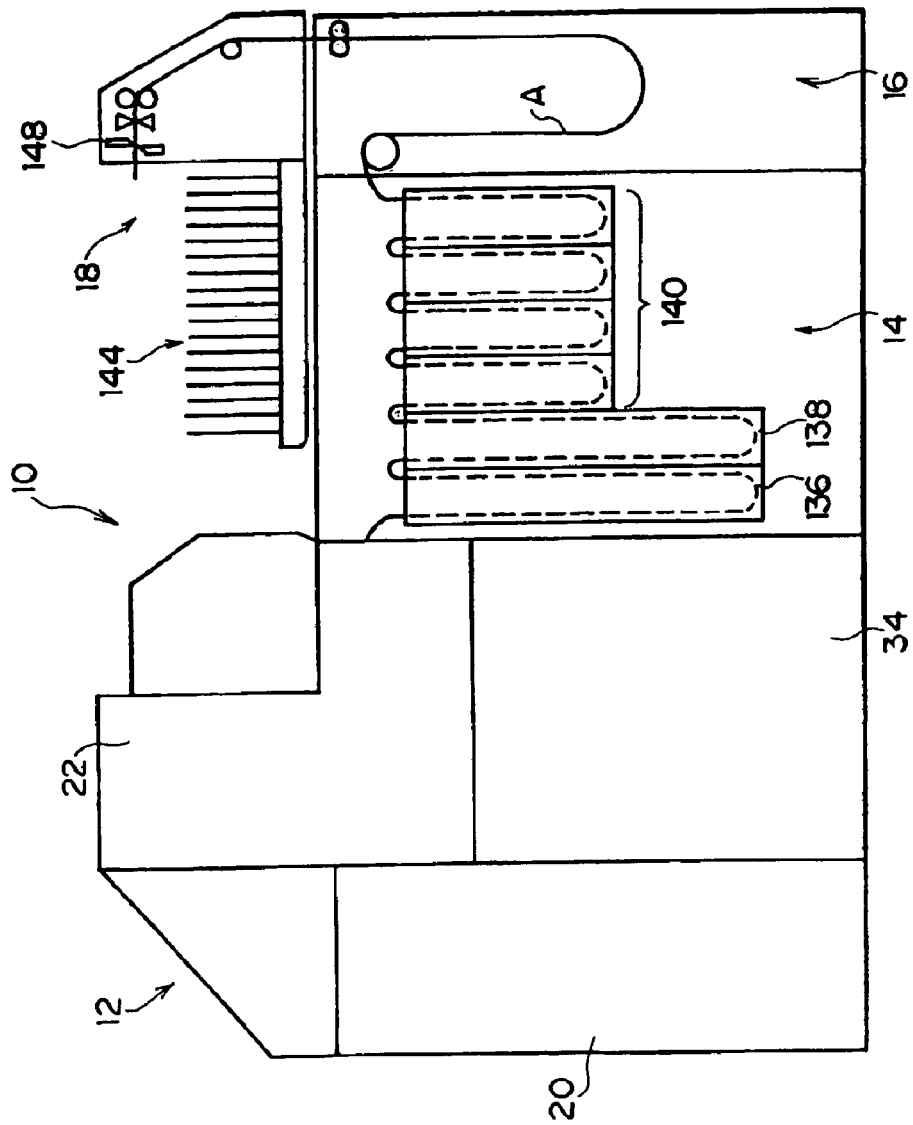
FIG. 1 is an overall schematic side view of an embodiment of an image recording apparatus according to the present invention.

As shown in FIG. 1, an image recording apparatus 10, which is used mainly as an image recording apparatus for a digital photo printer, is an apparatus in which, by reading an image by means of an image reading apparatus such as a film scanner, image data is formed, and then exposure conditions (image recording conditions) are determined in a setup apparatus on the basis of the image data. Thereafter, a photosensitive material is scan-exposed to have a latent image formed thereon by radiating a light beam based on the exposure conditions, and finally the image is outputted as a film print (photograph) after being developed. This apparatus has an image recording section 12, a developing section 14, a drying section 16, a discharge section 18, and an electrical equipment section 20 which houses control boards, a power supply and the like.

The image recording section 12 is provided with a printing and conveying apparatus 22 and a light-beam-scanning apparatus 24.

Figure 2:
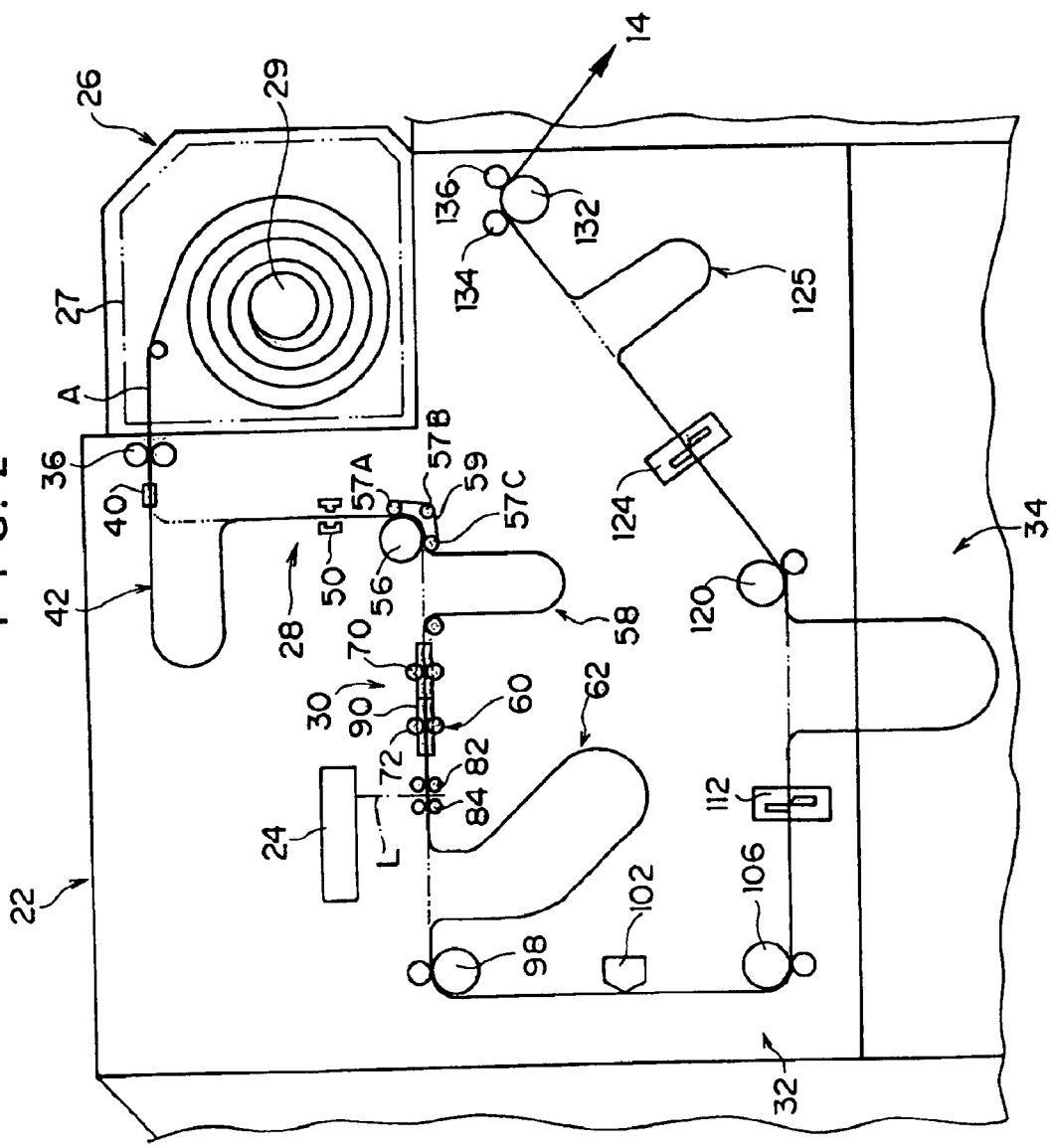
FIG. 2 is a schematic side view of a printing and conveying apparatus, showing the inside thereof.

As shown in FIG. 2, the printing and conveying apparatus 22 is an apparatus in which the photosensitive material A, which is accommodated in a coiled state in a photosensitive material magazine (described later), is pulled out from the magazine and conveyed on a predetermined path. During the conveyance, recording of positional image data, image-exposure (printing) and back-printing are carried out. The apparatus 22 comprises a photosensitive material supply section 26, a positional image data forming section 28 for recording positional image data, an exposure section 30, a back print section 32, a reservoir 34, and a conveyance means to convey the photosensitive material A along a predetermined path subsequent to these sections.

The photosensitive material supply section 26 is a portion in which a photosensitive material magazine 27 is mounted. The photosensitive material magazine 27 includes a shield case which is provided with a spool 29 and the web-form photosensitive material A, which is wound around the spool 29 in a coiled state and enclosed in the shield case. The magazine 27 is disposed at an upper side of the printing and conveying apparatus 22 and at a side of an exposure means. The exposure means includes the exposure section 30 and the light beam scanning apparatus 24.

A driving force from a magazine drive motor (not illustrated) may be transmitted through a clutch (not illustrated) to the spool 29 such that the spool can rotate so as to rewind the photosensitive material. Clutch ON and the clutch OFF respectively correspond to driving force transmission and driving force non-transmission. When the clutch is in an OFF state, the spool 29 is freely rotatable.

At a portion adjacent the photosensitive material magazine 27 is arranged a pair of pulling-out rollers 36 to pull out the photosensitive material A from the photosensitive material magazine 27, a widthwise guide section 40 to adjust a widthwise position of the photosensitive material A, and a first loop-forming portion 42 to form a U-shaped portion of the photosensitive material A.

The pulling-out roller 36 arbitrarily carries out nipping or nip canceling due to a nip canceling mechanism (not illustrated).

The widthwise guide section 40 adjusts a guide width depending upon the dimension (width) of the photosensitive material A by means of a guide-width adjusting mechanism (not illustrated).

The first loop-forming portion 42 makes the photosensitive material loose or slack such that this portion can serve as a buffer in the case of unexpected stoppage or conveyance of the photosensitive material due to the positional image data forming section 28, which is disposed at a downstream side.

The positional image data forming section 28 is disposed downstream of the first loop-forming portion 42 and is provided with a punch 50 to form a punch hole through the photosensitive material A. For the purpose of cutting the photosensitive material at the discharge section 18 (described later) and of exposure and back-printing, this positional image data forming section 28 forms positional image data on the photosensitive material, with the positional image data comprising positional data per print (frame information) and positional data per a predetermined number of units (sort information); for example, positional data per one roll of film 24- or 36-exposure film.

The exposure section 30 is disposed downstream of the positional image data forming section 28. Between the two sections 30 and 28 are arranged rollers 57A, 57B and 57C, with an endless belt 59 disposed therearound, and a conveyor roller 56.

The exposure section 30 includes a second loop-forming portion 58, a sub-scanning conveyance section 60, and a third loop-forming portion 62.

The sub-scanning conveyance section 60 includes a side guide member 90 and register rollers 70 and 72, which guide the photosensitive material A into a position for exposure.

Downstream thereof are disposed conveyor rollers 82 and 84, which precisely convey the photosensitive material to a position for exposure. The photosensitive material being conveyed in this state is two-dimensionally exposed by scanning in a main-scanning direction by means of the light-beam-scanning apparatus 24.

The second loop-forming portion 58 is situated upstream of the exposure position (the sub-scanning conveyance section 60) and the third loop-forming portion 62 is situated downstream of the exposure position. In other words, the sub-scanning conveyance section 60 is situated between the second loop-forming portion 58 and the third loop-forming portion 62. Thus, neither a conveyer means located upstream of the second loop-forming portion 58 nor a conveyer means located downstream of the third loop-forming portion 62 will have any adverse effects (e.g., back-tension or stress) on operations on the photosensitive material at the sub-scanning conveyance section 60. Accordingly, precise conveyance of the photosensitive material for sub-scanning is possible.

Further, downstream of the third loop-forming portion 62, via a conveyor roller 98, is disposed a back print section 32.

In the back print section 32, a variety of photograph data, such as photo dates and dates of recording to the photosensitive material, is recorded on the back side of the print or photosensitive material by means of a printing unit 102.

Downstream of the back print section 32 are disposed a conveyor roller 106, a first cutter 112, and a reservoir (fourth loop-forming portion) 34, in this order.

The first cutter 112, which does not work during usual operation, cuts the photosensitive material A in unusual cases, such as when a part of the photosensitive material that has been exposed and is still reserved in the reservoir 34 has to be discharged (full details thereof will be given below).

The reservoir 34 compensates for a difference in process speed between the image recording section 12 and the developing section 14 and thereby promotes efficient print making.

Downstream of the reservoir 34 are disposed a conveyor roller 120, a second cutter 124, and a fifth loop-forming portion 125, in this order.

The second cutter 124 is a cutter adapted to cut the photosensitive material in case of trouble. For example, if the amount of the photosensitive material being stored in the reservoir 34 is below a predetermined level or if the developing section 14 or the like has a problem, the photosensitive material will be cut by the second cutter 124. Thereby, no adverse effect is not exerted on a portion of the photosensitive material which has already been exposed and is accommodated in the reservoir 34, and a portion of the photosensitive material which is under conveyance in the printing and conveying apparatus 22 will not be unnecessarily and unexpectedly pulled toward the developing section 14 (see FIG. 2). Namely, such pulling, which would surely damage the printing and conveying apparatus 22, is effectively prevented.

The fifth loop-forming portion 125 compensates for a difference between process speed in the printing and conveying apparatus 22 and process speed in the developing section 14. This portion also prevents possible damage to the photosensitive material which might be caused by an unnecessary and unexpected pulling motion of the developing section 14 on the photosensitive material.

Downstream of the fifth loop-forming portion 125 are disposed a conveyor roller 132 and nip rollers 134 and 136.

Thereafter, the photosensitive material A is conveyed into the developing section 14.

The photosensitive material A that has arrived at the developing section 14 is conveyed to the drying section 16 through a developing bath 136, a fixing bath 138, and a rinsing bath 140. Thereafter, in the discharge section 18, sheets each having a predetermined length are cut from the material A by a cutter 148, and then accumulated in a sorter as finished prints.

Each of the five loop-forming portions, i.e., the first loop-forming portion 42 through to the fifth loop-forming portion 125, is structured such that when a distal end of the photosensitive material reaches the loop-forming portion, a guide means (not illustrated) guides the photosensitive material toward the downstream side along a linear path portion, as indicated by a dash-double-dot line in FIG. 2.

Next, the pair of pulling-out rollers 36 and a drive mechanism for the widthwise guide section 40, and control of rewinding of the photosensitive material, will be described in detail.

Figure 3:
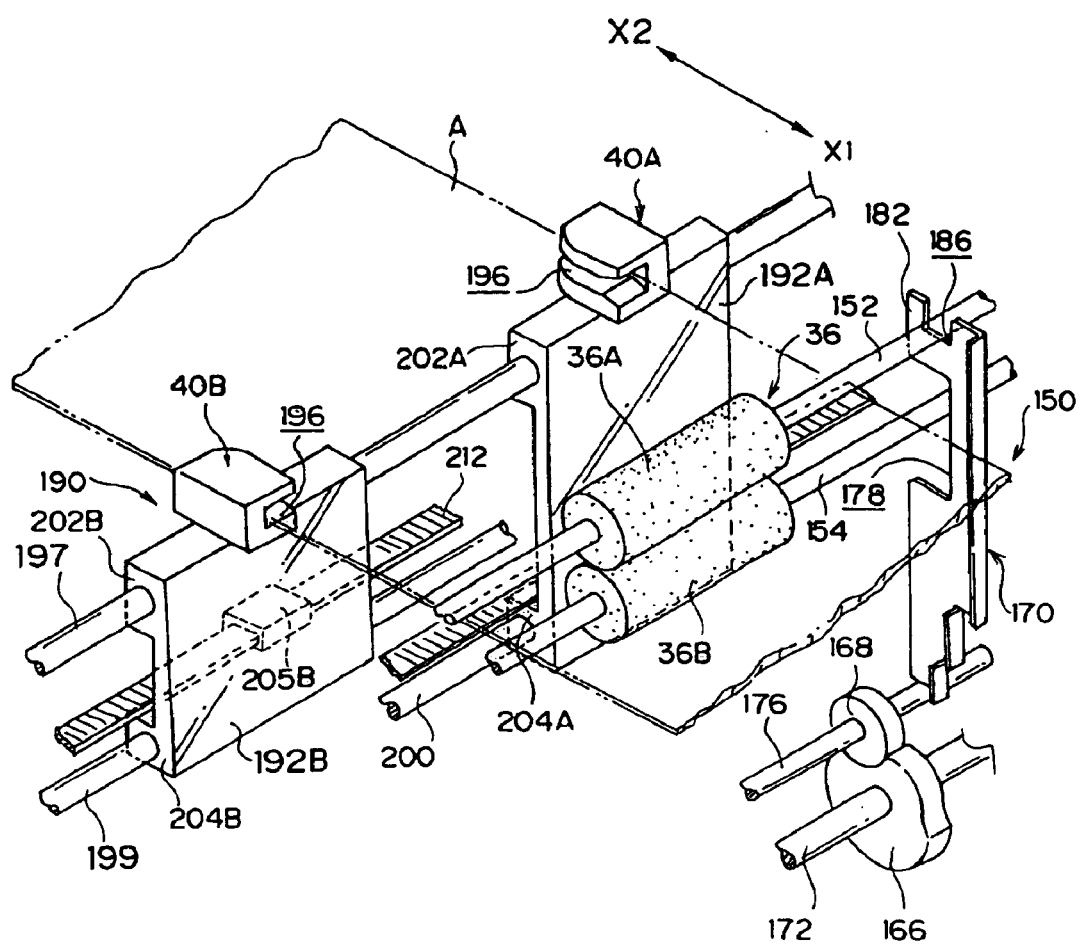
FIG. 3 is a perspective view illustrating main portions in an image recording apparatus.

As shown in FIG. 3, the nip canceling mechanism 150 is adapted to cancel a nip of the pulling-out roller pair 36. A guide-width adjusting mechanism 190 is adapted to adjust a guide width to be defined by the widthwise guide section 40.

Firstly, description will be made of the nip canceling mechanism 150 with reference to the drawings.

Figure 5:
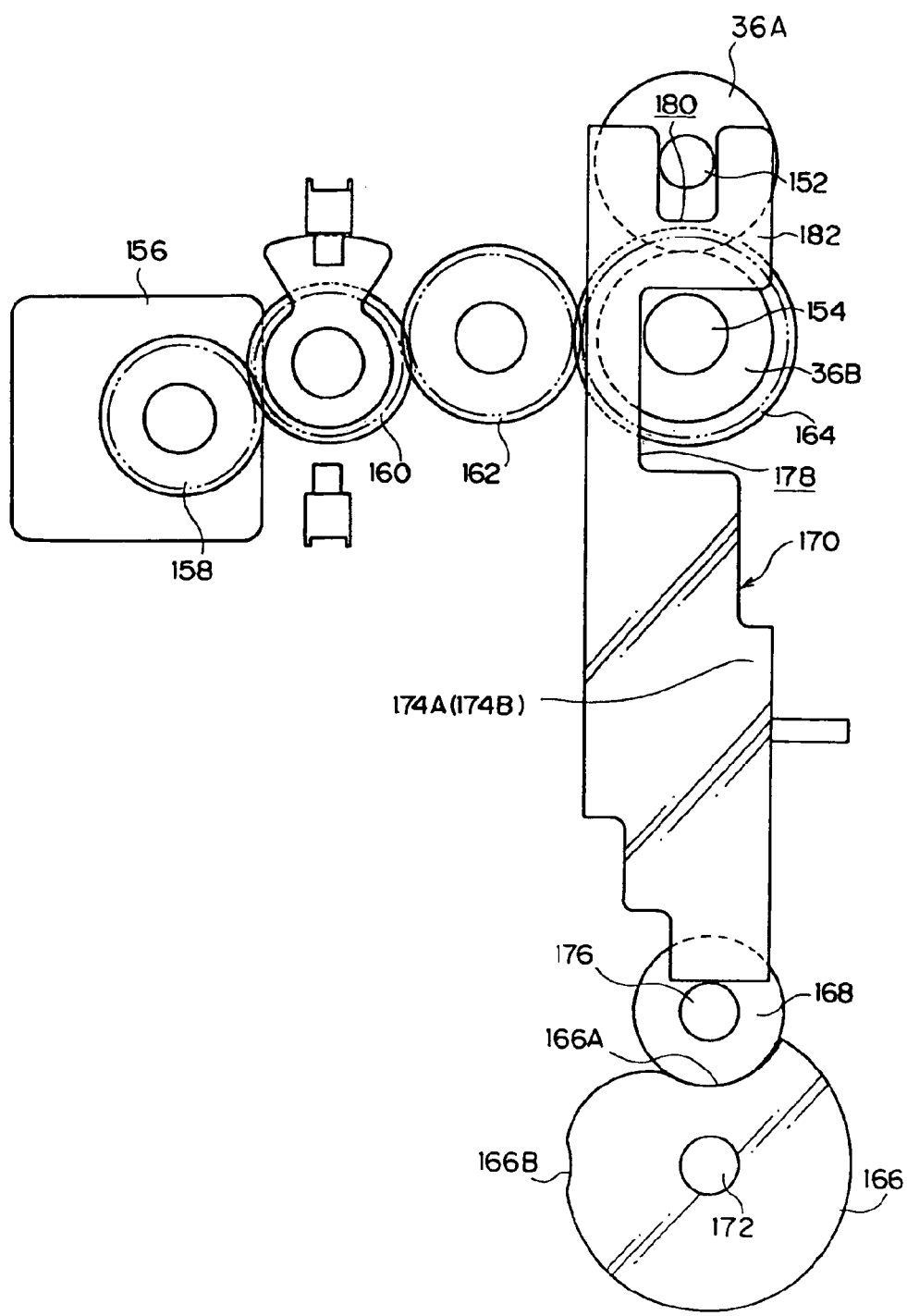
FIG. 5 is a side view illustrating a nipping state of the nip canceling mechanism.

As shown in FIG. 3, the pair of pulling-out rollers 36 is structured of an upper roller 36A having a shaft body 152 concentrically and integrally formed therewith and a lower roller 36B having a shaft body 154 concentrically and integrally formed therewith. As shown in FIG. 5, the lower roller 36B is driven for rotation by a driving force of a motor being transmitted to a gear 164 disposed at one end of the shaft body 154 through a driving gear 158 and transmission gears 160 and 162. When the photosensitive material A is nipped, it is conveyed toward the downstream side by means of operation of the motor 156.

Figure 4:
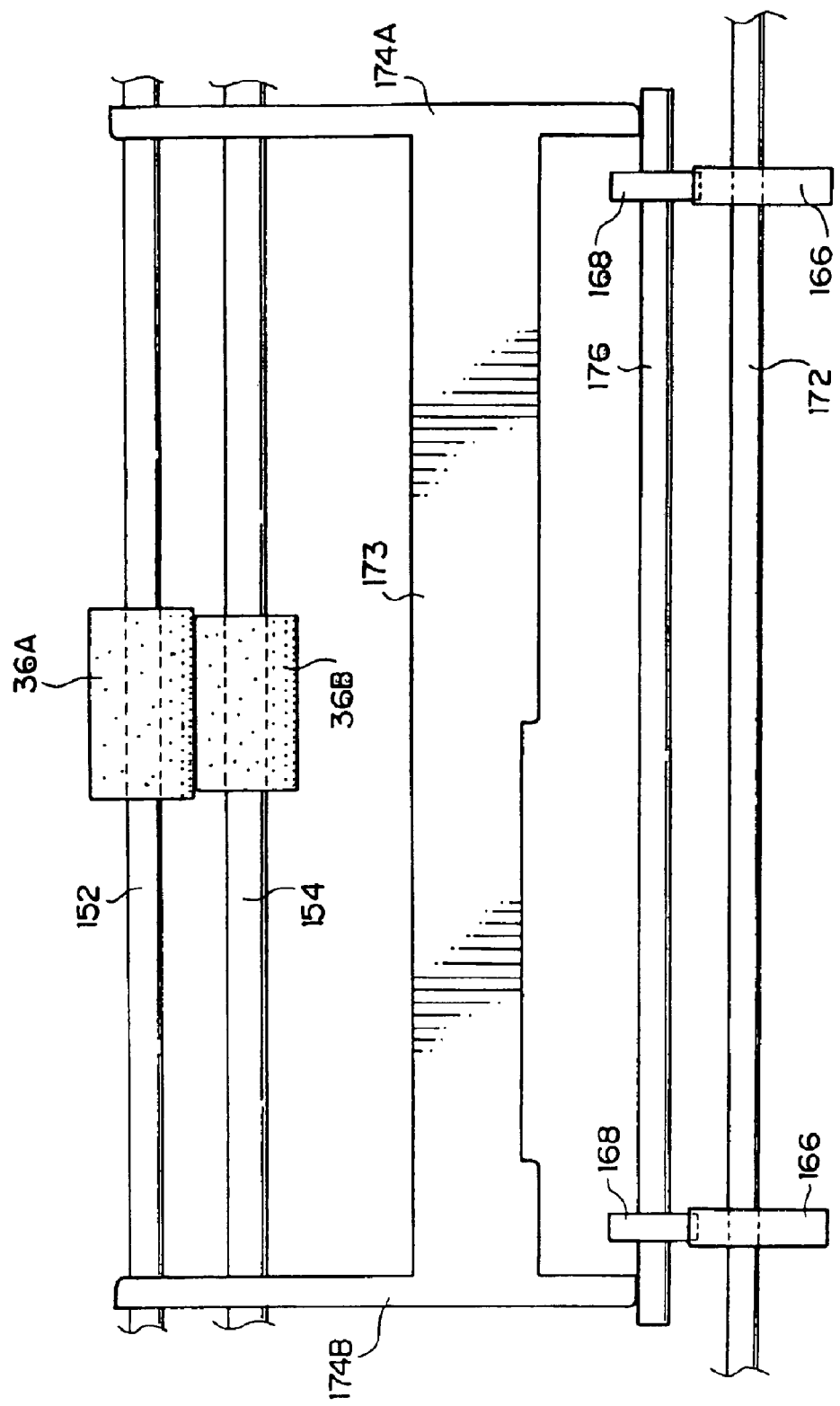
FIG. 4 is a front view of a nip canceling mechanism.

The nip canceling mechanism 150 is basically formed of a cam 166, a cam follower 168, and a support member 170. As shown in FIG. 4, each end of the shaft body 152 is provided with these elements, which are symmetrically disposed in relation to the shaft body 152. Accordingly, in order to make description simple and easy to understand, only one side's mechanism will be described below.

Configuration is such that the cam 166 is driven for rotation together with a shaft body 172 by means of a driving means (not illustrated). On the periphery of the cam 166 is engaged the cam follower 168 which moves relatively between two concave portions 166A and 166B in response to rotation of the cam 166 (see FIGS. 5 and 6).

The support member 170, as shown in FIG. 4, is structured such that it comprises a horizontal support portion 173 extending parallel to the shaft body 152 and support portions 174A and 174B of substantially flat-bar-shapes, each of which extends perpendicular to the horizontal support portion 173. The support portions 174A and 174B are of substantially the same configuration. Therefore, description will now be made only of the support portion 174A.

Figure 6:
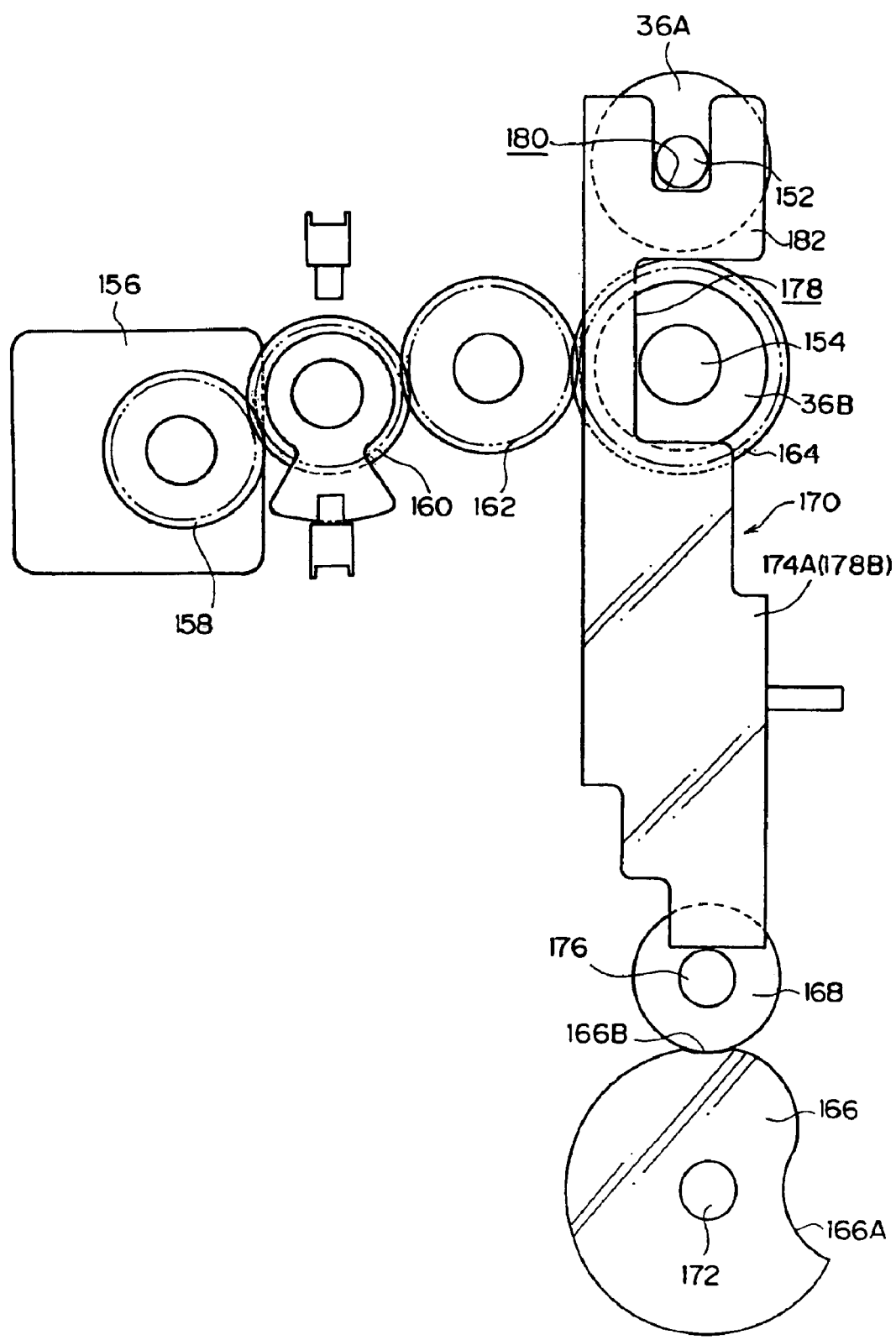
FIG. 6 is a side view illustrating a nip canceling state of the nip canceling mechanism.

As shown in FIGS. 5 and 6, the support portion 174A, which rides upon an end of the shaft body 176 of the cam follower 168, can move up and down together with the cam follower 168 in response to reciprocal rotation of the cam 166.

At an upper portion of the support portion 174A is provided a concave portion 178 and a protrusion portion 182. The concave portion 178 does not interfere with the shaft body 154 of the lower roller 36B during up-and-down motion of the concave portion 178. The protrusion portion 182 has at an upper part thereof a concave portion 180 which opens upward and into which the shaft body 152, which is generally urged toward the lower roller 36B side, is inserted.

As shown in FIG. 5, when the cam follower 168 is disposed in the concave portion 166A, a bottom surface of the concave portion 180 does not touch or support the shaft body 152. Therefore, under the effect of gravity, the upper roller 36A can abut and engage with the lower roller 36B. If the photosensitive material A is between the upper and lower rollers 36A and 36B, it will be nipped thereby.

As shown in FIG. 6, when the cam follower 168 is to be disposed in the concave portion 166B, as the support member 170 rises, the shaft body 152 is lifted by the bottom surface of the concave portion 180. Namely, the upper roller 36A is moved away from the lower roller 36B, thereby bringing about a nip canceling state.

Description will now be given of the guide-width adjusting mechanism 190.

Figure 7:
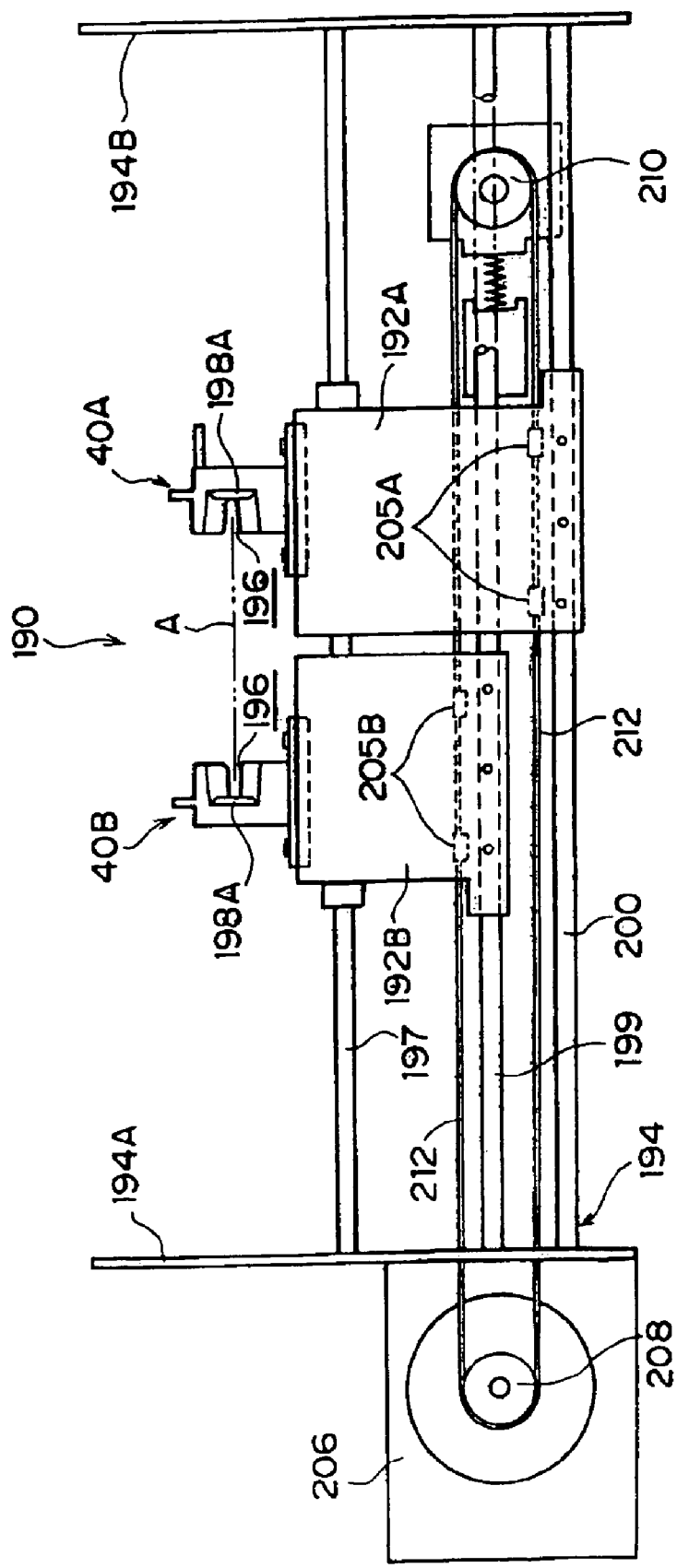
FIG. 7 is a front view of a guide-width adjusting mechanism.

As shown in FIGS. 3 and 7, the guide-width adjusting mechanism 190 basically comprises a pair of guide members 40A and 40B which constitute the widthwise guide section 40, support members 192A and 192B which support the guide members 40A and 40B, and a moving mechanism 194 which moves the support members 192A and 192B in a width direction.

Figure 8A:
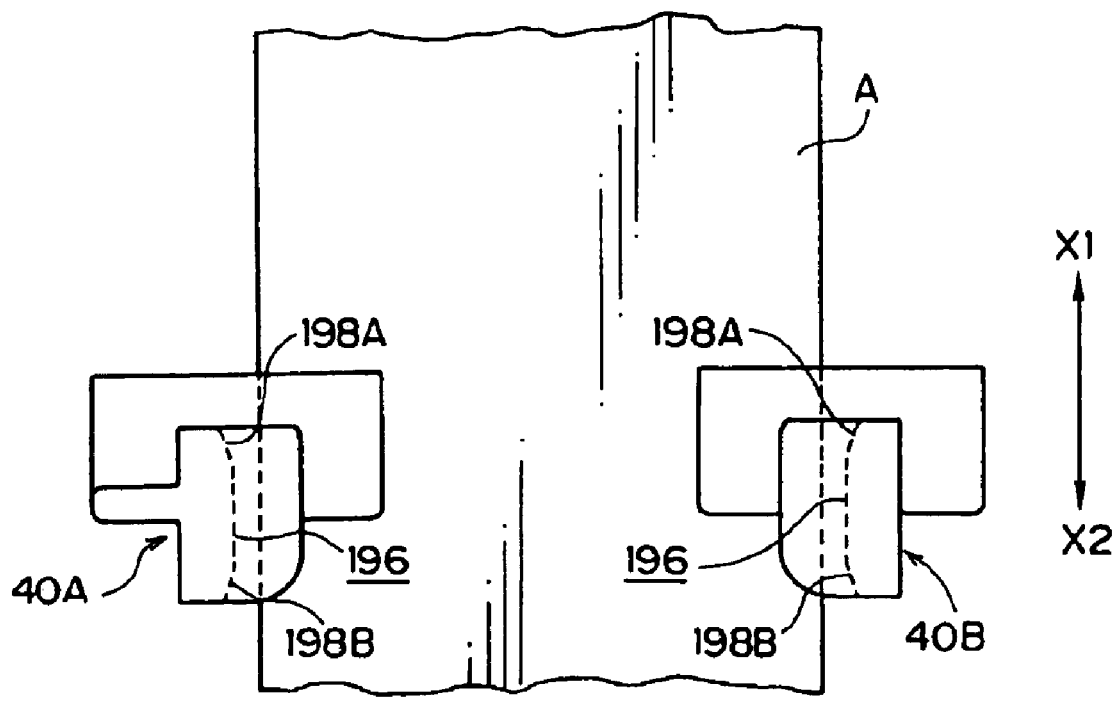
FIG. 8A is a plan view of widthwise guide members, in which a guiding width is set to be broad.
Figure 8B:
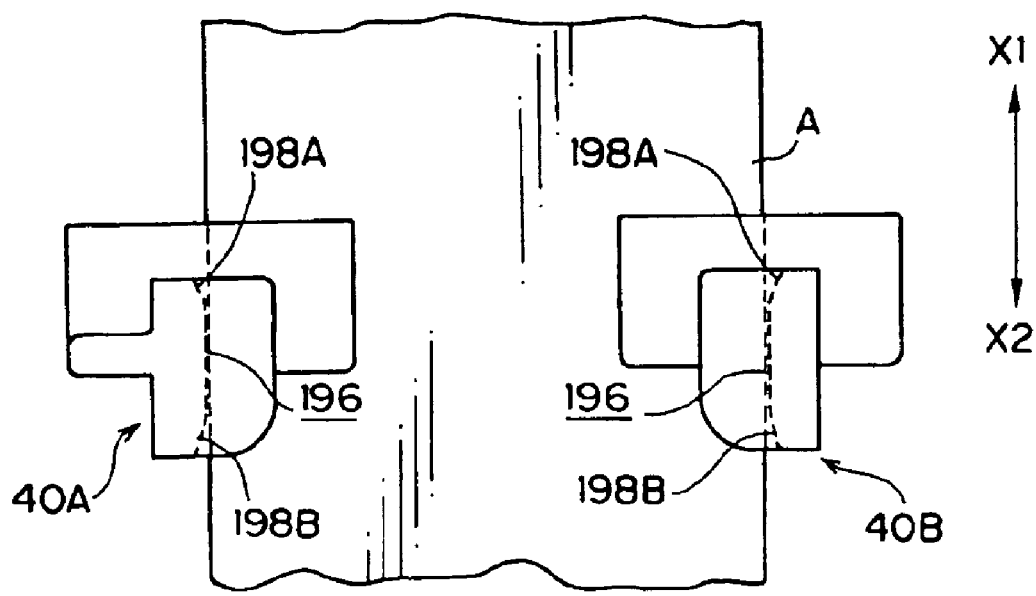
FIG. 8B is a plan view of the widthwise guide members, in which the guiding width is set to be narrow.

Each of the guide members 40A and 40B has a concave portion 196 with an opening. The openings of the concave portions 196 are mutually arranged facing one another. The concave portions 196 of the guide members arrest or regulate the photosensitive material in the widthwise direction. As shown in FIGS. 8A and 8B, each of the concave portions 196 has at an upstream portion thereof a surface 198A which is externally tapered toward the upstream side of the photosensitive material conveying direction (indicated by arrow X1 in the drawings) and has at a downstream portion a surface 198B which is externally tapered toward the downstream side of the photosensitive material conveying direction (indicated by arrow X2).

As shown in FIGS. 3 and 7, there are provided two support plates 194A and 194B, which are separated by a predetermined length and oppose each other, between which three shafts 197, 199, and 200 are disposed, these shafts horizontally extending parallel to one another so as to bridge between the support plates 194A and 194B. The support member 192A, on which the guide member 40A is mounted, is guided by the shafts 197 and 200 for translatory motion in the widthwise direction. The support member 192A has, at a surface thereof facing the downstream side, convex portions 202A and 204A only where the shafts 197 and 200, respectively, pass therethrough, and has no portion which may interfere with the shaft 199 or a chain 212 (details of which will be described later). The lower convex portion 204A has at its upper surface engaging portions 205A, which are engaged with the chain 212.

The support member 192B, on which the guide member 40B is mounted, is guided by the shafts 197 and 199 for translatory motion in the widthwise direction. The support member 192B has, at a surface thereof facing the downstream side, convex portions 202B and 204B only where the shafts 197 and 199, respectively pass therethrough, and has no portion which may interfere with the shaft 200 or the chain 212. The lower convex portion 204B has at its upper surface engaging portions 205B, which are engaged with the chain 212.

The moving mechanism 194 is structured by a motor 206 disposed at an outer side of the support plate 194A, a sprocket 208 mounted on an output shaft of the motor 206, another sprocket 210 freely rotatably provided at a location close to an inner side of the support plate 194B, and the chain 212 wound around the sprockets 208 and 210.

The chain 212 is an endless loop and has two horizontally extending portions in parallel, to one of which (a lower portion) are secured the engaging portions 205A provided on the upper surface of the lower convex portion 204A of the support member 192A and to the other of which (an upper portion) is secured the engaging portions 205B provided on the lower convex portion 204B of the support member 192B. Therefore, when the chain 212 is moved, the support members 192A and 192B move in opposite directions. Namely, in response to a direction of rotation of the motor 206, the guide members 192A and 192B move towards or away from one another.

In place of the chain 212, annular members and wheel members for power transmission, e.g., a timing belt, pulley or the like, can be used.

Referring now to the timecharts of FIGS. 10–12, description will be given of conveyance operations for exposure and rewinding operations using the nip canceling mechanism 150 and the guide-width adjusting mechanism 190.

Figure 10:
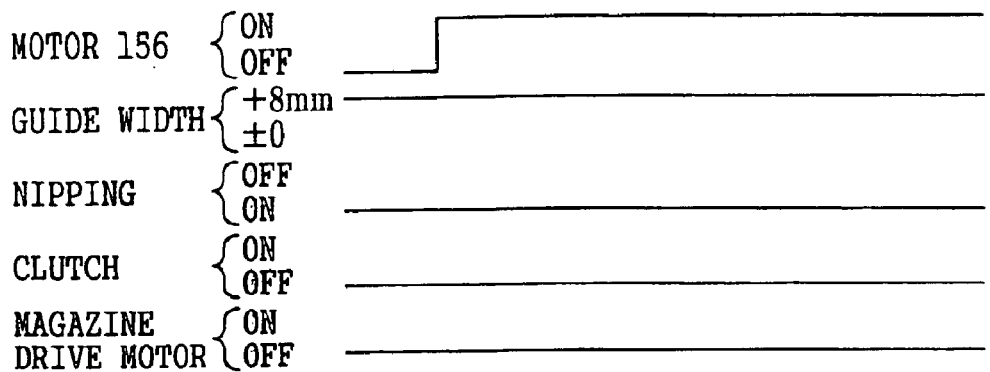
FIG. 10 is an exemplary timechart for a feeding process of the photosensitive material.

In usual conveyance operation for exposure, as shown in the timechart of FIG. 10, when the magazine drive motor is stopped and the clutch is in the OFF state, the photosensitive material is conveyed. Namely, while the photosensitive material is conveyed, the spool 29 of the magazine 27 is freely rotatable. At this time, pulling-out roller pair 36 nips the photosensitive material. More specifically, the cam follower 168 is positioned in the concave portion 166A of the cam 166 of the nip canceling mechanism 150, so that the upper roller 36A and the lower roller 36B are in a nipping state and nip the photosensitive material. In this state, when the motor 156 operates, the pulling-out roller pair 36 rotates. Thereby, the photosensitive material A is pulled out from the photosensitive material magazine 27 and conveyed to the predetermined exposure position. At this time, a distance between the concave portions 196 of the guide members 40A and 40B structuring the widthwise guide section 40 is set to be considerably greater, e.g., by 8 mm, than width of the photosensitive material A. This is because, if the distance between the concave portions 196 of the guide members 40A and 40B is the same as the width of the photosensitive material A, there will be a possibility of occurrence of jamming of the photosensitive material portion sent out by the pair of pulling-out rollers 36.

Figure 9A:
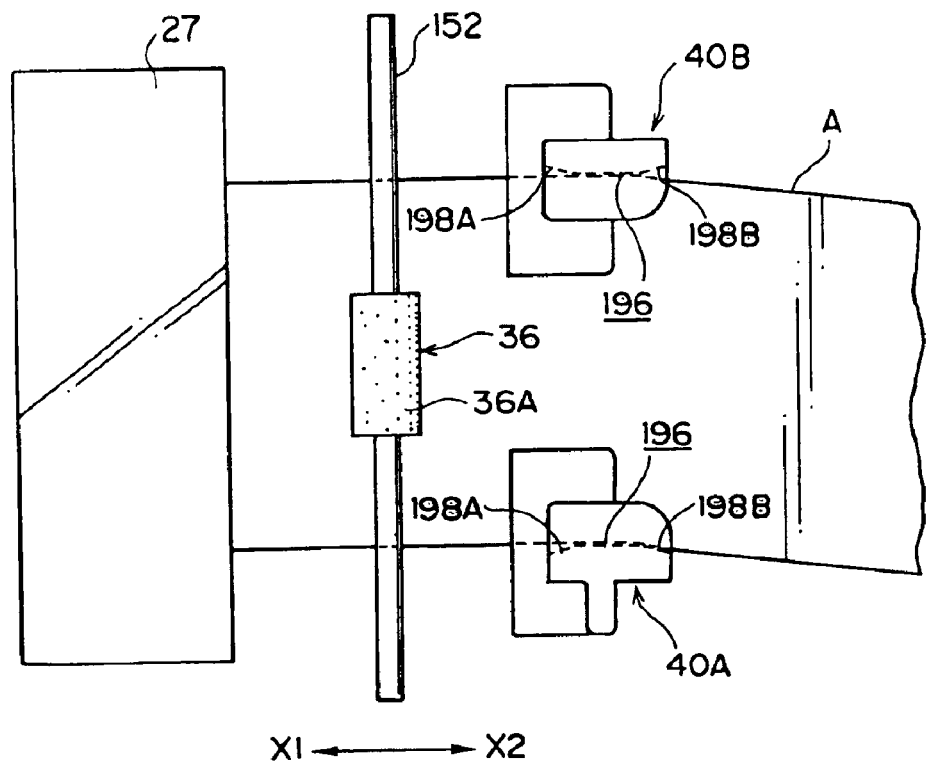
FIG. 9A is a view illustrating a state of rewinding photosensitive material.
Figure 9B:
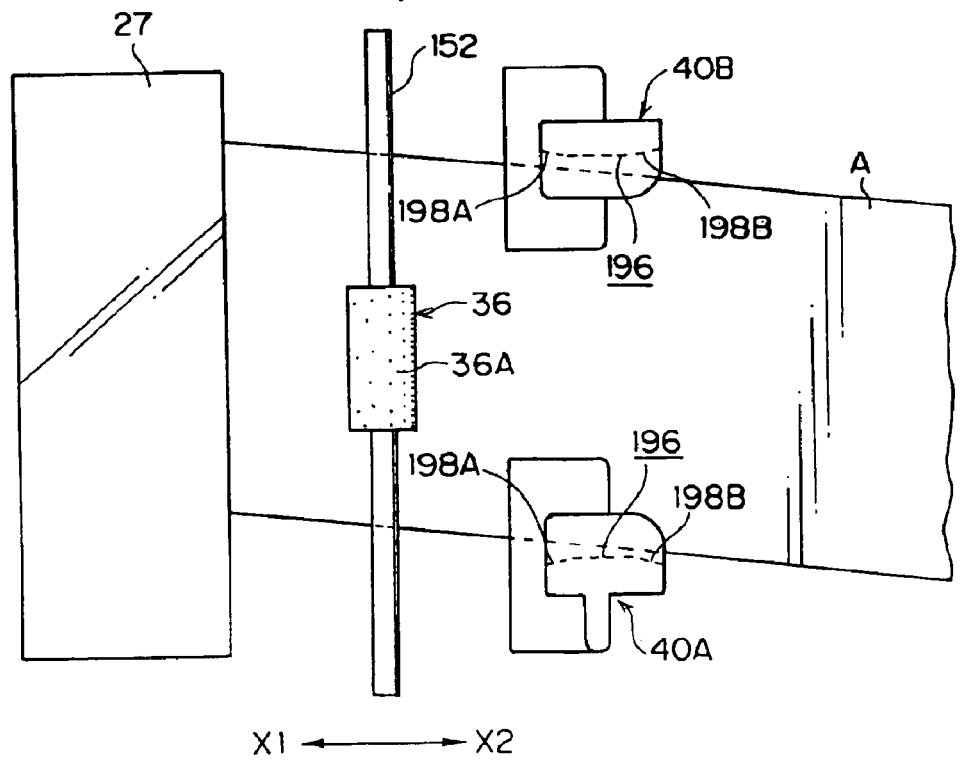
FIG. 9B is a view illustrating a problem during a rewinding operation.

If, for some reason or other, the photosensitive material were to be rewound in this exposure conveyance state, the photosensitive material could not be displaced in the widthwise direction thereof, because the photosensitive material would be nipped by the pair of pulling-out rollers 36. Further, since the distance between the concave portions 196 of the guide members 40A and 40B would be considerably greater than the width of the photosensitive material A, as described above, skew of the photosensitive material A could not be corrected. Due to these facts, there would be a large possibility of the photosensitive material being rewound and accommodated in the photosensitive material magazine 27 in a skewed manner, as shown in FIG. 9B.

As described above, prior to the rewinding operation of the photosensitive material, the photosensitive material is cut by the first cutter 112 or the second cutter 124 to separate an exposed photosensitive material portion therefrom.

Figure 11:
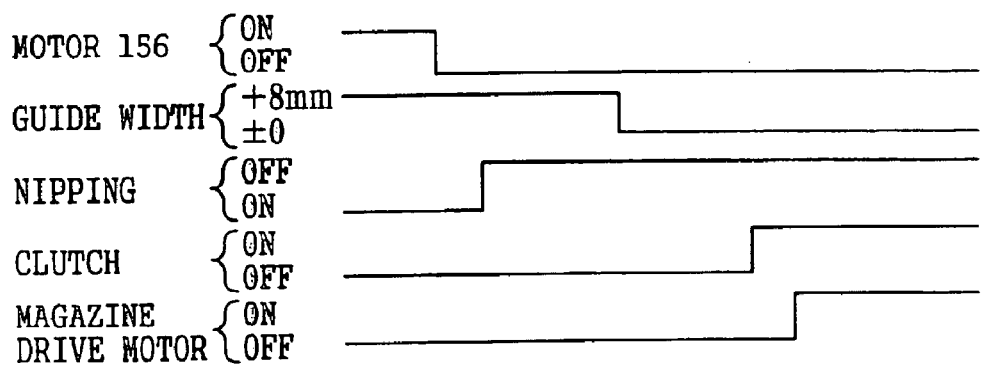
FIG. 11 is an exemplary timechart for a rewinding process of the photosensitive material.

A process for rewinding an unexposed photosensitive material portion is carried out according to the timechart of FIG. 11. Namely, the motor 156 is stopped such that the pulling-out roller pair 36 ceases to convey (or draw out) the photosensitive material. Thereafter, the nipping state of the pulling-out roller pair 36 is cancelled. More specifically, the cam 166 is rotated clockwise from a position in which the cam follower 168 fits in the cam concave portion 166A as shown in FIG. 5 to a position in which the cam follower 168 fits in the cam concave portion 166B as shown in FIG. 6. Accordingly, the support member 170 is made to move upward by the shaft body 176 so that the upper roller 36A is separated from the lower roller 36B, thereby canceling nipping of the photosensitive material.

Next, the width defined by the guide members 40A and 40B is narrowed so as to substantially coincide with the width of the photosensitive material A. More concretely, in the guide-width adjusting mechanism 190, the chain 212 is turned in a counterclockwise direction by driving of the motor 206, such that the support members 192A and 192B are moved toward one another. Thus, the distance between the concave portions 196 of the guide members 40A and 40B is set to be approximately the same as the width of the photosensitive material. Specifically, the distance between the concave portions is preferably in a range of −2 mm to +4 mm with respect to the width of the photosensitive material A, and more preferably in a range of −1 mm to +2 mm. Here, the reason why these setting ranges are broad is that an amount of curvature of the photosensitive material varies depending on surface quality and thickness thereof (e.g., 240 μm to 260 μm for SUPREME THICK PAPER, 160 μm to 200 μm for SUPREME THIN PAPER, etc.). This is also because fragility of the photosensitive material varies depending on level of gloss of the photosensitive material surface (GLOSSY A, MAT, etc.). For example, in the case of SUPREME THIN PAPER, it is preferable that the guide-width to be defined by the guide members 40A and 40B is set to be narrower, with a margin of −1 mm. The reasons why the range −2 mm to +4 mm is applied are because good effects of controlling skew cannot be achieved if the upper limit is more than +4 mm and because there is a possibility that the photosensitive material will receive damage if the lower limit is less than −2 mm.

When the photosensitive material A is rewound or conveyed in the direction of arrow X1, the clutch is switched on, into an engaged state, and the magazine drive motor operates. Accordingly, driving force from the motor is transferred to the spool 29 such that the photosensitive material is rewound into the magazine 27. At this time, the photosensitive material A can shift in the width direction, since the nipping state of the pair of pulling-out rollers 36 has been cancelled. Therefore, as shown in FIG. 9A, even if the photosensitive material A is skewed, the concave portions 196 of the guide members 40A and 40B slidingly contact and guide the photosensitive material A such that the material A can be reliably and consistently corrected to a predetermined position and attitude. As a result, the photosensitive material is received in the photosensitive material magazine 27 without skew.

The guide members 40A and 40B are arranged on each side of the photosensitive material A as previously described, and the tapered surfaces 198A and 198B of the concave portions 196 smoothly guide the photosensitive material A such that end surface portions and edge portions of the guide members 40A and 40B do not scratch or damage the photosensitive material A.

Figure 12:
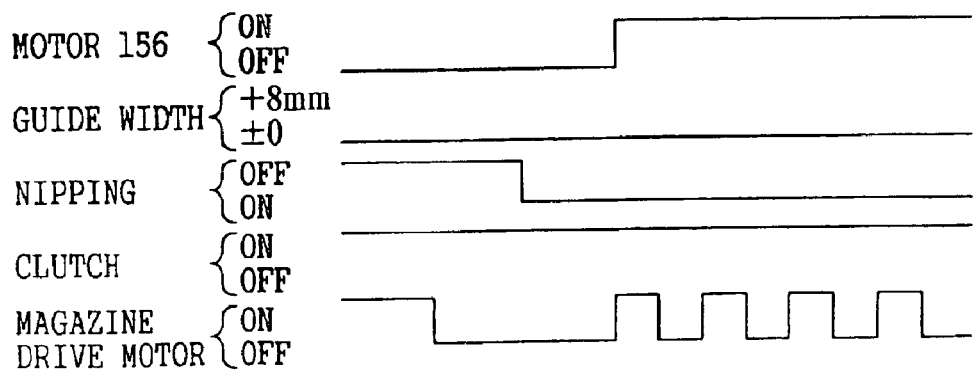
FIG. 12 is an exemplary timechart for a process of positioning a free or tip end of the photosensitive material.

When the amount of a remaining portion of the photosensitive material becomes a minimum in the rewinding process, that is, when a distal end (now tail end) of the photosensitive material is sensed by a sensor provided at a predetermined position on the conveyance path, a process to position the photosensitive material distal end in a precise manner is carried out, for example, in accordance with the timechart shown in FIG. 12.

Firstly, the magazine drive motor is stopped in order to cease rewinding of the photosensitive material around the spool 29. Next, the pair of pulling-out rollers 36 returns to a position for nipping the photosensitive material. Then, by operation of the motor 156, the pair of pulling-out rollers 36 feeds the photosensitive material in the rewinding direction by a certain length such that the distal end of the photosensitive material moves to a predetermined position. At this time, the magazine drive motor operates intermittently such that loosening of the photosensitive material in the magazine 27 will not be caused. With this control, skew of the photosensitive material can be prevented and excellent rewinding thereof is possible. Precise positioning of the photosensitive material distal end is also possible.

A nip canceling mechanism that is manually operable by a lever or the like may be provided instead of the above-described nip canceling mechanism of motorized drive type.

A structure is also possible in which the upper and lower rollers 36A and 36B can themselves be displaced in the width direction of the photosensitive material.

What is claimed is:

1. An image recording apparatus in which an image is formed by exposing a photosensitive material, the apparatus comprising:
    a magazine for accommodating the photosensitive material in a light-shielded state;
    a pair of rollers which nip and pull out the photosensitive material from the magazine to inside the apparatus;
    a widthwise guide which is disposed in a vicinity of the pair of rollers and which restricts a rewinding direction of the photosensitive material by engaging edges of the photosensitive material at a time of rewinding of the photosensitive material; and
    a restriction canceling mechanism for canceling a width direction restriction of the photosensitive material due to the pair of rollers;
    wherein, when the photosensitive material is to be rewound into the magazine, the restriction of the photosensitive material due to the pair of rollers is cancelled by the restriction canceling mechanism, and a guide width defined by the widthwise guide is made narrower than when the photosensitive material is being pulled out.

2. The image recording apparatus of claim 1, wherein the restriction canceling mechanism comprises a mechanism for canceling the nipping state of the pair of rollers.

3. The image recording apparatus of claim 1, wherein, when the photosensitive material is to be rewound, the guide width defined by the widthwise guide is in a range of −2 mm to +4 mm relative to width of the photosensitive material.

4. The image recording apparatus of claim 1, wherein the widthwise guide comprises at least one taper surface angled in a direction such that the guide width is narrower toward the magazine.

5. The image recording apparatus of claim 1, wherein the guide width defined by the widthwise guide can be adjusted in accordance with the kind of the photosensitive material.

6. The image recording apparatus of claim 1, wherein the widthwise guide is disposed at a downstream side of the pair of rollers in a photosensitive material conveying direction.

7. The image recording apparatus of claim 1, wherein the widthwise guide is disposed at an upstream side of the pair of rollers in a photosensitive material conveying direction.

8. An image recording apparatus in which an image is formed by exposing a photosensitive material, the apparatus comprising:

a magazine for accommodating the photosensitive material in a light-shielded state;

a pair of rollers which nip and pull out the photosensitive material from the magazine to inside the apparatus body;

a widthwise guide which is disposed in a vicinity of the pair of rollers and which restricts a rewinding direction of the photosensitive material by engaging edges of the photosensitive material at a time of rewinding of the photosensitive material; and a restriction canceling mechanism for canceling a width direction restriction of the photosensitive material due to the pair of rollers;

wherein, when the photosensitive material is to be rewound into the magazine, the restriction of the photosensitive material due to the pair of rollers is cancelled by the restriction canceling mechanism, and a guide width defined by the widthwise guide is set such that skew of the photosensitive material can be corrected.

9. The image recording apparatus of claim 8, wherein the restriction canceling mechanism comprises a mechanism for canceling the nipping state of the pair of rollers.

10. The image recording apparatus of claim 8, wherein, when the photosensitive material is to be rewound, the guide width defined by the widthwise guide is in a range of −2 mm to +4 mm relative to width of the photosensitive material.

11. The image recording apparatus of claim 8, wherein the widthwise guide comprises at least one taper surface angled in a direction such that the guide width is narrower toward the magazine.

12. The image recording apparatus of claim 8, wherein the guide width defined by the widthwise guide can be adjusted in accordance with the kind of the photosensitive material.

13. The image recording apparatus of claim 8, wherein the widthwise guide is disposed at a downstream side of the pair of rollers in a photosensitive material conveying direction.

14. The image recording apparatus of claim 8, wherein the widthwise guide is disposed at an upstream side of the pair of rollers in a photosensitive material conveying direction.

15. A method for rewinding photosensitive material in an image recording apparatus that has a magazine for accommodating the photosensitive material in a light-shielded state, a pair of rollers which nip and pull out the photosensitive material from the magazine to inside the apparatus, a widthwise guide which is disposed in a vicinity of the pair of rollers and which controls a rewinding direction of the photosensitive material by engaging with edges of the photosensitive material during the rewinding of the photosensitive material, the method comprising the steps of:

canceling a width direction restriction of the photosensitive material due to the pair of rollers;

making a guide width defined by the widthwise guide narrower than when the photosensitive material is being pulled out; and rewinding the photosensitive material.

* * * * *